United States Patent
Nilsson

[15] 3,692,074
[45] Sept. 19, 1972

[54] CHIPPING AND SAWING MACHINE
[72] Inventor: Philip Nilsson, Soderhamn, Sweden
[73] Assignee: Kockum-Soderhamm Aktiebolag, Soderhamn, Sweden
[22] Filed: March 3, 1970
[21] Appl. No.: 16,007

[52] U.S. Cl. .................. 144/39, 144/176, 144/312, 144/326
[51] Int. Cl. ............................................. B27c 9/00
[58] Field of Search .......... 144/39, 37, 41, 176, 3–14, 144/162, 176, 312, 326

[56] References Cited

UNITED STATES PATENTS 3,442,310  5/1969  Mitten et al. .............. 144/312
3,486,541  12/1969  Nilsson ...................... 144/176

FOREIGN PATENTS OR APPLICATIONS 779,721  3/1968  Canada ....................... 144/39

Primary Examiner—Donald R. Schran
Attorney—McGlew and Toren

[57] ABSTRACT

In a chipping and sawing machine a log is first passed through a chipping machine in which two opposite sides of the log are provided with planar parallel surfaces. As the log passes from the chipping machine at least one board is cut from each of the opposite sides by sawing members. The chipping machine consists of a pair of spaced chipping discs in the form of truncated cones with the small ends of the cones facing each other. As the log passes the chipping machine, it is directed on each side by guides into the path of the sawing members which are positioned adjacent the chipping machine so that the log contacts the sawing members while it is still guided between the discs of the chipping machine.

2 Claims, 1 Drawing Figure

PATENTED SEP 19 1972
3,692,074
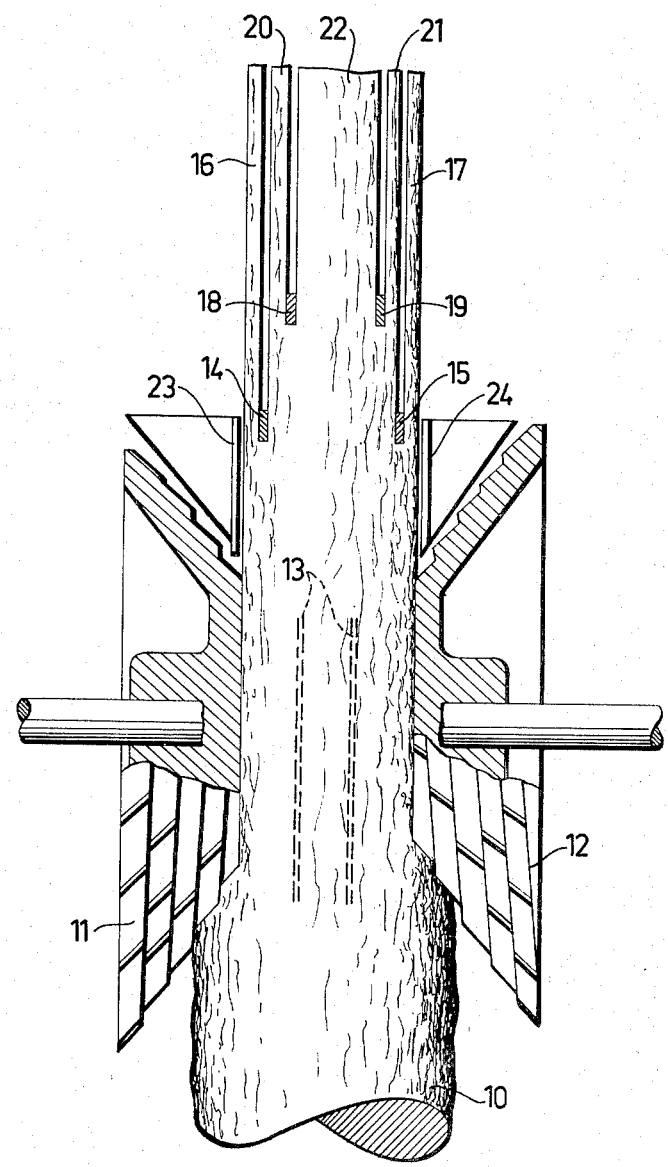
INVENTOR:
PHILIP NILSSON
By: McGlew & Toren
ATTORNEYS

CHIPPING AND SAWING MACHINE

SUMMARY OF THE INVENTION

The present invention relates to a chipping and sawing machine for forming planar surfaces on the opposite sides of a log and for cutting boards from the planar sides.

It has previously be proposed in connection with the sawing of logs to make the logs plane at least on two opposite sides before the sawing. Preferably, this is carried out by cutting up certain side portions of the logs into chips. This involves considerable economic advantages. The normal procedure is that the logs are first caused to pass through a chipping machine of a particular kind, called a canter or blocking machine, and are then conveyed to a suitable sawing machine. Both the canter and the sawing machine constitute separate entities each having its own infeed conveyors, for instance.

It would seem that hitherto one has given the canter or blocking machine credit for too great an ability to impart a stable flatness to the logs on the surfaces mentioned. Thus, it has evidently be overlooked that although the surfaces are plane immediately after the planing operation, said operation simultaneously alters the inner tensions in the logs to such an extent that bends and twists occur in the planed log after a few seconds only. This phenomenon is particularly noticeable in the wintertime, when the logs may be frozen. If such bends and twists occur on the way from the canter or blocking machine to the sawing machine, at least the outermost boards sawn will not, of course, have the desired accurate dimensions, and this is a serious drawback.

The object of the present invention is to eliminate said drawbacks, and for that purpose the machine according to the invention has been designed first by forming planar opposing sides on a log using chipping members and then cutting boards from the planar sides using sawing members of claim 1.

The invention ensures that the sawing of the outermost boards always occurs in planes parallel to the planed surfaces of the log, and thereby the thickness of the boards is the same all over. Of course, it may even then occur that after the sawing, the boards become bent or warped but this circumstance is of little importance, the essential thing being that the boards have the correct thickness. Further, bent or warped boards will normally be straightened out when placed in piles or the like.

The invention will be described in more detail below with reference to the accompanying drawing which shows, in top view and very diagrammatically, an embodiment chosen as an example of a chipping and sawing machine according to the invention.

The drawing shows a log 10 passing a pair of chipping members in the form of truncated conical disc 11,12. The log is supported by a conveyor 13 indicated diagrammatically only. The discs 11,12 impart to the log two opposed flat surfaces by cutting up into chips the side portions of the log which would otherwise constitute slabs at an ordinary sawing operation.

In the travelling direction of the log, very closely following the chipping discs, there is a pair of sawing members 14,15 for sawing a board 16,17 on either side of the log just planed, and in the embodiment shown a further pair of sawing members 18,19 for sawing an additional pair of boards 20,21 follows rather close to the sawing members 14,15, a central block 22 being left to be sawn in the ordinary way. The drawing shows, further, a pair of additional guides 23,24 near the discs 11,12.

Conveniently, the conveyor 13 is rather narrow so that it can extend in between and past the sawing members 14,15,18,19 and in case of need it may be amplified by an overlying conveying and holding device of a suitable kind.

The chipping members 11,12 may be of any suitable kind, the only essential thing in the present context being that they must impart two opposed parallel surfaces to the logs. However, it would seen that particularly favorable results are obtained when using chipping discs of the kind disclosed in our U.S. Pat. application Ser. No. 886,496 filed Dec. 19, 1969, now U.S. Pat. No. 3,645,308 issued Feb. 29, 1972. However, it should be pointed out that in the present case — since one is always dealing with logs particularly selected for sawing — it never becomes necessary to bring the discs entirely together to cut up the whole log into chips. Therefore, there is no requirement for the chipping discs 11,12 to be mounted in any predetermined rotary positions in relation to each other, and it is hardly even necessary to maintain full synchronism between the discs, even though it is in the nature of the matter that at least a substantially complete synchronism is preferable. It will be appreciated that for the above reasons the driving means of the chipping discs 11,12 can be made rather simple.

It has been mentioned that the chipping discs 11,12 need never be brought entirely together, but on the other hand it is of course advisable to mount then such that they are at least to some extent adjustable towards and from each other. It is also convenient to arrange the sawing members 14,15 and 18,19, respectively, adjustable towards and from each other.

In the example described, the sawing members are assumed to be band saw blades but the invention is by no means limited thereto, and it is also possible to use other sawing members, such as frame saw blades.

As to the guides 23,24 it should be pointed out that in some cases such a good guidance may be expected from the narrow ends of the chipping discs 11,12 that the guides 23,24 may be entirely dispensed with.

A plurality of modifications and alterations of details are possible within the scope of the inventive idea.

I claim:

1. Chipping and sawing machine for cutting a log comprising a frame, chipping means including chipping members rotatably journalled thereon for cutting the oppositely disposed side portions of the log into chips so that the two opposite sides of the log are provided with planar surfaces disposed parallel to each other, sawing members for sawing at least one board from each planar side of the log, and driving means for the chipping and sawing members, wherein the improvement comprises that said sawing members are located following said chipping means so that the log is still guided by said chipping means when the sawing operation is commenced for avoiding warping, twisting or bending in the log in consequence of the variations in inner tensions in the log caused by the chipping operation, conveying means arranged for advancing the log to said chipping member and between said chipping members and said sawing members, said chipping means includes guides, said chipping members are truncated cones spaced apart having the smaller ends thereof facing each other, said driving means for said cones are rotatable about an axis transverse to the direction of movement of the log on said conveying means, each of said cones having a plurality of knives spaced axially and radially with each said knife having a first edge line disposed to operate in a first plane containing the grains of the log and a second edge line merging with said first edge line disposed in a second plane intersecting said first plane to cut across the grains, and each of said guides is associated with a different one of said chipping members and is positioned between the associated said chipping member and said sawing members and extends from a point adjacent the smaller end of said chipping member to a point beyond the leading edge of said sawing member for guiding one of the two opposite sides of said log provided with planar surfaces between said chipping member and said sawing members.

2. Machine as claimed in claim 1, characterized in that each truncated cone has openings adjacent each knife to receive and, if desired, let through the chips being cut by said knives.

* * * * *

UNITED STATES PATENT OFFICE
CERTIFICATE OF CORRECTION

Patent No. 3,692,074                Dated September 19, 1972

Inventor(s) PHILIP NILSSON

It is certified that error appears in the above-identified patent and that said Letters Patent are hereby corrected as shown below:

In the heading of the patent, insert the following:

-- [30]  Foreign Application Priority Data
   March 5, 1969  Sweden..........3034/1969 --

Signed and sealed this 13th day of February 1973.

(SEAL)
Attest:

EDWARD M. FLETCHER, JR.              ROBERT GOTTSCHALK
Attesting Officer                    Commissioner of Patents